April 8, 1930.   J. C. DRADER   1,753,778
RACK
Original Filed Nov. 10, 1927
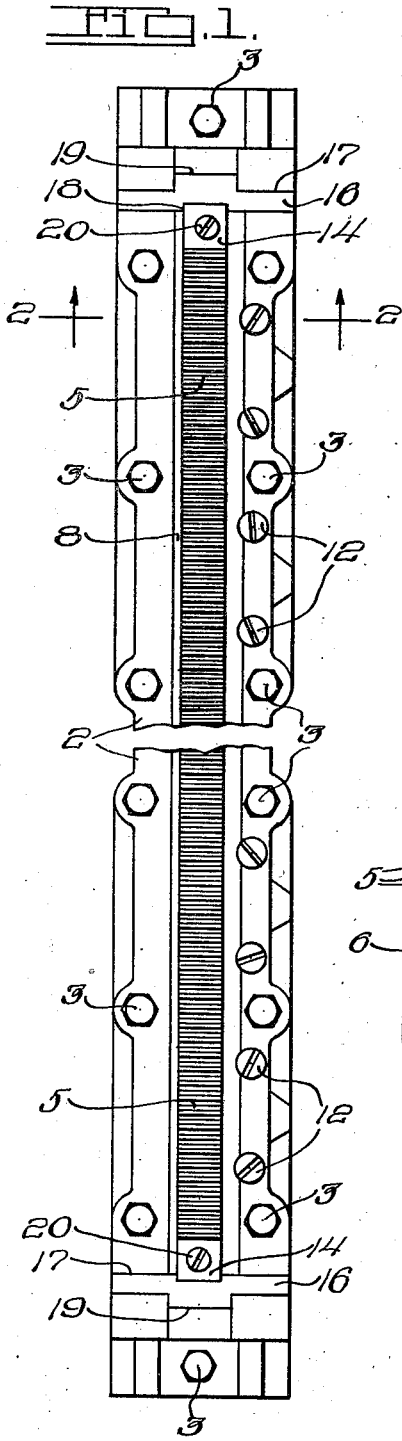
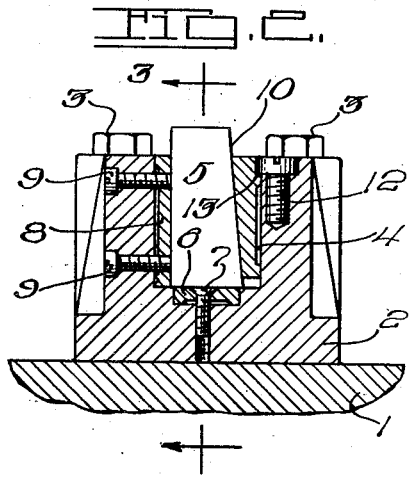
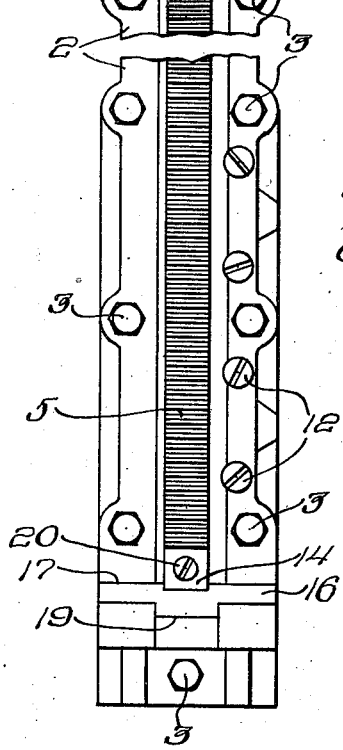
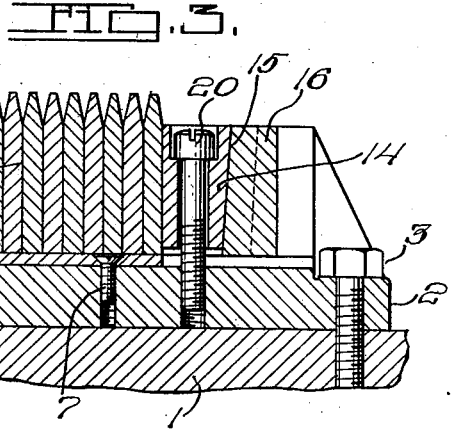
INVENTOR:
Joseph C. Drader
BY
Harness, Dickey & Pierce
ATTORNEYS Patented Apr. 8, 1930

1,753,778

UNITED STATES PATENT OFFICE

JOSEPH C. DRADER, OF DETROIT, MICHIGAN

RACK

Original application filed November 10, 1927, Serial No. 232,226. Divided and this application filed June 19, 1929. Serial No. 372,172.

This invention relates to toothed racks for engagement by gears or the like, the principal object being the provision of a very accurate rack construction, and is a division of my application for Letters Patent of the United States on lead testing machine, filed November 10, 1927, Serial No. 232,226.

Another object of the invention is to permit the teeth of a rack to be very accurately spaced in proper coacting relation by forming said teeth upon separate members and selectively positioning said members with respect to one another to compensate for any variations in the thickness of said members.

Another object is to provide a clamping means effective upon all of a row of members individually forming rack teeth, to permanently maintain said members in proper coacting relation.

A further object is to form rack teeth upon corresponding ends of a plurality of members adapted to be secured in abutting relation, and to so bevel corresponding side edges of said members as to adapt them to be firmly clamped upon a suitable support by an element extending longitudinally of the rack in engagement with said beveled faces.

These and various other objects the invention attains by the construction hereinafter described and illustrated in the accompanying drawings, wherein:

Fig. 1 is a plan view of the improved rack.

Fig. 2 is a cross sectional view of the same, taken upon the line 2—2 of Fig. 1, and drawn to a larger scale.

Fig. 3 is a fragmentary vertical section taken longitudinally of the rack through an end portion thereof, as indicated by the line 3—3 of Fig. 2, and drawn to a larger scale.

In these views, the reference character 1 designates a portion of the machine or apparatus of which the rack forms a part, and 2 indicates the base of the rack which has preferably the nature of an elongated metallic bar, secured to the support 1 by a plurality of cap screws 3 or the like. The base 2 is formed with a channel 4 opening in its top face and extending lengthwise of the base in a preferably equidistant relation to the sides thereof. In the channel is disposed a row of tooth-forming members 5 having their abutting faces preferably parallel, and having their upper ends formed as teeth which project above said base, as best appears in Fig. 3. It is preferred to form these members of tool steel of uniform thickness.

The members 5 are seated upon a liner strip 6 engaging the bottom of the channel 4, and rigidly secured to the base 2 by screws 7. A similar liner strip 8, perpendicular to the liner strip 6, engages a side wall of the channel and is rigidly secured thereto by screws 9. The side edges of the members 5 engaging the liner 8 are transverse to the length of the teeth, and their opposite side edges are slightly inclined to the length of the teeth, as indicated at 10, so as to gradually increase the width of the members 5 as they extend from their toothed edges toward their base.

The inclined edges 10 are engaged by a wedge 11 having its inner face beveled correspondingly to the edges 10 of the members 5, and fitted between said members and the adjacent side wall of the channel 4. At its bottom, the wedge is spaced above the bottom ends of the members 5 so that it may be forced downwardly between said members and the adjacent channel side wall to firmly clamp the members 5 against the liners 8 and 16. To apply the clamping stresses, a plurality of screws 12 are tapped into the top face of the base, with their heads bearing upon shoulders 13 formed by recessing the sides of the wedge. It is to be particularly noted here that the action of the wedge is to force the members 5 against both of the fixed liners 6 and 8, thereby accurately locating them with respect to both.

I also provide a pair of wedges 14 engaging opposite ends of the row of tooth-forming members to clamp these members firmly against each other over the length of the rack. The wedges 14 have vertical faces engaging the corresponding end members 5, and their opposite faces are slightly inclined, as indicated at 15. The faces 15 engage correspondingly inclined faces formed upon abutment blocks 16 which extend across the rack channel and are snugly fitted into grooves 17, transversely formed in the base at its opposite site ends. The blocks 16 are adapted to accurately position the wedges 14 with respect to the sides of the base 2 by forming the wedge-engaging faces of said blocks with shallow grooves 18 to receive said wedges, and the opposite faces of said blocks are formed with projections 19 fitting into the channel 4 toward the base extremities, to additionally position said blocks. For applying a clamping stress to the wedges 14, screws 20 are downwardly extended through suitable bores in said wedges and tapped into the base 1.

By forming the rack teeth individually upon separate members and assembling said members in the described manner, it is possible to secure substantially perfect uniformity of spacing between said teeth. It may appear that errors arising from any slight variations in the thickness of the members 5 will be accumulative in their effect, but a complete compensation for any such errors is possible by so relatively positioning said members prior to permanently clamping them in place, as to secure the desired uniform spacing of the teeth.

It is an important feature of the construction that the tooth-forming members have abutting portions considerably larger than the teeth thereof, so as to provide bearing faces of considerable size, the clamping engagement of which will accurately maintain the teeth in the desired relation.

The described rack has a particular application to use in machines for testing the lead of screw threads, spiral gears, or other helically-shaped parts, but may further be employed wherever it is important to secure a high degree of accuracy as regards the spaced relation of rack teeth.

What I claim is:

1. A toothed rack comprising a row of abutting members having corresponding edge portions thereof spaced and fashioned to form rack teeth, and means for applying a clamping stress to all of said members through an application of pressure to the end members of the row.

2. A toothed rack comprising a row of abutting members having corresponding edge portions thereof spaced and fashioned to form rack teeth, a base carrying said members, an abutment upon said base for one end of the row, a wedge member engaging the other end of the row, and a screw engaging said wedge member with said base to clamp said row against said abutment.

3. A toothed rack comprising a supporting base formed with a longitudinal channel, a plurality of tooth-forming members forming a row in said channel, means carried by said base for exerting a clamping pressure upon said members lengthwise of the row, and means carried by the base for clamping said members against a side wall and a bottom wall of said channel.

4. A toothed rack comprising a supporting base formed with a channel, abutments carried by said base at the ends of said channel, a row of tooth-forming members arranged in said channel between said abutments, a wedge entered in said channel between said row and one of said abutments, and means engaging said wedge with said base for actuating the wedge forcibly into the channel.

5. A toothed rack comprising a channeled base, a plurality of members arranged within the channel of the base and having faces abutting transversely to the length of the channel, said members being formed with coacting rack teeth projecting above said base in spaced relation, and means carried by the base for rigidly securing said toothed members in their abutting relation.

6. A toothed rack comprising a plurality of separately formed members arranged in a row in abutting relation and formed upon corresponding edges with spaced rack teeth, and correspondingly tapered in width from their toothed edges to their opposite ends, and means cooperating with corresponding side edges of said teeth for rigidly securing said teeth in the described relation.

7. A toothed rack comprising a row of members formed upon corresponding edges with spaced rack teeth, of a base mounting said members, providing a seat for corresponding side edges thereof, a wedge member engaging the opposite side edges of said teeth, a member carried by the base for guiding the wedge member in its wedging travel, and means carried by the base for actuating such travel.

8. In combination, a supporting member provided with a groove, a plurality of separately formed rack teeth positioned in said groove and projecting therefrom, each of said teeth increasing in width from the top thereof to its base, and wedging means cooperating with the edges of said teeth for forcing said teeth against the opposite side and the bottom of said groove.

9. In combination, a supporting member provided with a longitudinally extending groove, a plurality of separately formed rack teeth positioned in said groove in contact with each other, each of said teeth being provided with an angularly extending side edge, wedging means cooperating with said edges to force said teeth against the side and the bottom of said groove, transverse slots in said member adjacent the ends thereof, blocks in said slots extending across said groove, and wedging means cooperating with said blocks and the adjacent sides of said teeth for forcing all of said teeth into close contact with each other.

JOSEPH C. DRADER.